United States Patent [19]

Lundberg et al.

[11] 4,145,379
[45] Mar. 20, 1979

[54] SULFONATED POLYMER COMPOSITION

[75] Inventors: Robert D. Lundberg, Bridgewater; Henry S. Makowski, Scotch Plains, both of N.J.; Jan Bock, Houston, Tex.

[73] Assignee: Exxon Research & Engineering Co., Florham Park, N.J.

[21] Appl. No.: 855,729

[22] Filed: Nov. 29, 1977

[51] Int. Cl.² .................. C08L 9/00; C08L 47/00
[52] U.S. Cl. .................. 260/879; 260/878 R; 260/885; 260/DIG. 31
[58] Field of Search ......... 260/79.3 R, 878 R, 879, 260/889, DIG. 31, 31.2 R, 31.6

[56] References Cited

U.S. PATENT DOCUMENTS

| 3,842,154 | 10/1974 | Lundberg et al. | 264/294 |
| 3,847,854 | 11/1974 | Canter et al. | 260/23.7 M |
| 4,014,847 | 3/1977 | Lundberg et al. | 264/33.4 R |

*Primary Examiner*—Lewis T. Jacobs
*Attorney, Agent, or Firm*—R. E. Nanfeldt

[57] ABSTRACT

The present invention relates to a process for improving the melt processability and properties of metal neutralized sulfonated polymers by the use of a reactive plasticizer wherein the plasticizer improves the flow of the ionic polymer during processing, and subsequently is polymerized by a free radical process into a thermoset polymer. The resultant composition is an intimate blend of ionic polymer with a thermoset polymer, wherein the resultant composition has improved properties.

34 Claims, 2 Drawing Figures

SULFONATED POLYMER COMPOSITION

BACKGROUND OF THE INVENTION

1. Field of the Invention

The present invention relates to a process for improving the melt processability and properties of metal neutralized sulfonated polymers by the use of a reactive plasticizer wherein the plasticizer improves the flow of the ionic polymer during processing, and subsequently is polymerized by a free radical process into a thermoset polymer. The resultant composition is an intimate blend of ionic polymer with a thermoset polymer, wherein the resultant composition has improved properties.

2. Description of the Prior Art

The plastics industry has long sought a material which can be readily fabricated at moderate temperatures much like conventional thermoplastics (i.e., polyethylene or polypropylene), yet which in their molded form are very resistant to elevated temperatures like conventional thermosets. Thus, there has been considerable effort expended to achieve the desirable fabrication characteristics of thermoplastics, yet retain the excellent heat resistance of chemically crosslinked materials. A number of approaches have been utilized to achieve this goal.

Recently, a new class of thermoelastic sulfonated polymers has been described in a number of U.S. patents. These sulfonated polymers are derived from polymeric materials having olefinic unsaturation, especially elastomeric polymers such as butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The SO$_3$H groups of the sulfonated elastomer can be readily neutralized with a basic material to form an ionically cross-linked elastomer at room temperature having substantially improved physical properties over an unsulfonated elastomer. However, these sulfonated elastomers, unlike their unsulfonated counterparts, may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° C. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer.

Although these aforementioned patents appreciate the use of a preferential plasticizer for improving the processability of the neutralized sulfonated elastomer, the present invention teaches a class of plasticizers which provides a different assemblage of melt flow and physical properties. The improved compositions of the present invention provide a means for preferentially plasticizing the ionic groups of the neutralized sulfonated polymer during processing and the subsequent conversion of the plasticizer by a free radical polymerization into a thermoset polymer thereby improving the physical properties of the polymeric composition such as heat distortion and heat stability.

Reactive plasticizers have been used to plasticize the glassy phase but not the crystalline phase of polyvinyl chloride thereby resulting in compositions of rather inferior properties. In the present instant invention, at elevated temperatures the plasticizer plasticizes both the glassy phase (polymeric backbone) and the ionic domain created by the association of the ionic groups. At ambient temperatures the ionic groups are not substantially plasticized, thereby providing a free flowing powder.

In particular, one approach has been described in a number of U.S. Pat. Nos. 3,557,046; 3,557,049; 3,557,256; 3,074,905; 3,247,289, among others. In these patents a mixture of polyvinyl chloride and a reactive plasticizer (such as ethylene glycol dimethacrylate) is combined with a free radical polymerization catalyst. The resulting mixture is a free flowing powder or a fluid suspension. As such, the powder or suspension can be molded at moderate temperatures to create a gel, which is a flexible plasticized composition of PVC in which the reactive plasticizer is acting much like a conventional plasticizer. However, when this composition is then subjected to heat within a mold, the polymerization of the reactive plasticizer is promoted and thereby a cross-linked composition is created.

These materials are of interest because they afford an approach to creating thermoset properties from thermoplastics using plastics type processing conditions. Heretofore, this approach has been directed at polyvinyl chloride or its copolymers with occasional reference to other polyvinyl halides. While the products from PVC are useful and of commercial significance, they have many disadvantages such as liberation of HCl on burning, limited heat distortion temperature, limited plasticizer choice, and limited heat stability.

It is significant that the work directed toward reactive plasticizers has been concerned almost exclusively with polyvinyl chloride. Attempts to apply these approaches to polystyrene or related polymers do not give the highly desirable results observed with PVC. If a fine dispersion of polystyrene is combined with the reactive plasticizer at a level of 20 or more parts per hundred of polymer, a free flowing powder or a fluid suspension is not obtained. Instead a massive agglomeration is observed which results in a solid mass of tacky polymer. Such a material undergoes cold flow at ambient temperatures and therefore cannot be handled by any of the convenient means normally employed for polymer powders.

As previously mentioned, reactive plasticizers have been used in polyvinyl chlorides. However, in attempts to use these reactive plasticizers with polymethylmethacrylate, polyvinyl acetate, polyvinyl butyral, poly-α-methyl styrene and polystyrene, a massive agglomerate is typically formed which results in a solid mass of tacky polymer at sufficiently high plasticizer concentration. These materials undergo cold flow at ambient temperatures and, therefore, cannot be handled by any of the conventional fabrication means for thermoplastic systems. In the case of polyvinyl chloride, the resultant compositions have limited heat distortion and heat stability. The plasticization of the sulfonated polymers of the present invention with a reactive plasticizer form a composition having improved physical properties such as heat distortion, tensile and modulus as well as being capable of being readily processed on conventional fabricating equipment.

Therefore, the present instant invention provides a means for improving both the rheological and physical properties of a neutralized sulfonated polymer which was not previously attainable or predictable as taught by the aforementioned patents.

SUMMARY OF THE INVENTION

It has been found surprisingly that neutralized sulfonated polymeric compositions having both improved rheological and physical properties can be formed by a unique and novel process, therein a reactive plasticizer and a free radical curing agent are mixed with the neutralized sulfonated polymer. The reactive plasticizer first plasticizes the polymeric backbone and ionic groups at an elevated temperature at or below the fabrication temperature of the composition thereby improving the rheology of the composition, the reactive plasticizer subsequently cures as the temperature is raised to the fabrication temperature, into a thermoset polymer thereby forming a blend of the neutralized sulfonated polymer and the thermoset polymer which has improved physical properties.

Accordingly, it is an object of our present invention to provide a unique and novel process for the formation of a unique and novel neutralized sulfonated polymeric composition of a blend of a neutralized sulfonated polymer and a thermoset polymer which has a different set of physical properties.

GENERAL DESCRIPTION OF THE INVENTION

The present invention relates to a unique and novel process for the formation of a neutralized sulfonated polymeric composition of a neutralized sulfonated polymer and a thermoset polymer which has a different balance of physical properties as compared to the neutralized sulfonated polymers of the prior art.

The sulfonated polymers of the present invention have a hydrocarbon backbone and are selected from the group consisting essentially of thermoplastics and elastomeric polymers.

The thermoplastics of the present invention are polystyrene, poly-α-methyl styrene, poly-t-butyl styrene, polyvinyl toluene or polychlorostyrene.

The polyvinyl aromatic resins of the present invention possess a softening point (glass transition temperature) of between about 35° C. to about 160° C., preferably about 50° C. to about 140° C., and most preferably about 60° C. to about 140° C. The thermoplastic polymer has an $\overline{M}_w$ of about 5,000 to about 1,000,000 and more preferably about 10,000 to about 500,000. These thermoplastic polymers can be prepared directly by any of the known polymerization processes. The term "thermoplastic" is used in its conventional sense to mean a substantially rigid (flexural modulus > 10,000 psi) material capable of retaining the ability to flow at elevated temperatures for relatively long times. Illustrative of the thermoplastics which may be used is polystyrene, for example Styron 666 (Dow Chemical Co.) having a glass transition temperature of about 100° C. and an $\overline{M}_n$ of about 140,000.

The elastomeric polymers of the present instant invention are derived from synthetic and natural polymers having olefinic unsaturation sites, wherein the polymer has from about 0.1 to about 10.0 mole percent olefinic unsaturation. The unsaturation sites can be in the polymer backbone, pendent therefrom or cyclic.

In particular, the unsaturated polymers of this present invention include low unsaturated polymers such as butyl rubber or EPDM terpolymers.

Other low unsaturated elastomeric polymers are partially hydrogenated isoprenes, partially hydrogenated polybutydienes, styrene-butadiene copolymers, or isoprene-styrene random copolymers.

The expression "Butyl rubber" as employed in the specification and claims is intended to include copolymers made from a polymerization reaction mixture having therein from 70 to 99.5% by weight of an isoolefin which has about 4 to about 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000, especially about 100,000 to about 400,000 and a Wijs Iodine Number of about 0.5 to 50, preferably 1 to 15. The preparation of butyl rubber is described in U.S. Pat. No. 2,356,128, which is incorporated herein by reference.

For the purposes of this invention, the butyl rubber may have incorporated therein from about 0.2 to 10% of combined multiolefin; preferably about 0.5 to about 6%; more preferably about 1 to about 4%, e.g., 2%.

Illustrative of such a butyl rubber is Exxon Butyl 365 (Exxon Chemical Co.), having a mole percent unsaturation of about 2.0% and a Mooney Viscosity (ML, 1 + 8, 212° F.) of about 40–50.

The EPDM terpolymers are low unsaturated polymers having about 1 to about 10.0 wt. % olefinic unsaturation, more preferably about 2 to about 8, most preferably about 3 to about 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 wt. % ethylene and about 1 to about 10 wt. % of a diene monomer, the balance of the polymer being propylene. Preferably, the polymer contains about 50 to about 70 wt. % ethylene, e.g. 50 wt. % and about 2.6 to about 8.0 wt. % diene monomer, e.g. 5.0 wt. %. The diene monomer is preferably a non-conjugated diene.

Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.) a terpolymer having a Mooney viscosity (ML, 1 + 8, 212° F.) of about 40 and having an ethylene content of about 40 wt. % and a 5-ethylidene-2-norbornene content of about 5.0 wt. %. The $\overline{M}_n$ of Vistalon 2504 is about 47,000, the $\overline{M}_v$ is about 145,000 and the $\overline{M}_w$ is about 174,000.

Another EPDM terpolymer, Vistalon 2504-20, is derived from Vistalon 2504 by a controlled extrusion process, wherein the resultant Mooney viscosity at 212° F. is about 20. The $\overline{M}_n$ of Vistalon 2504-20 is about 26,000, the $\overline{M}_v$ is about 90,000 and the $\overline{M}_w$ is about 125,000.

In carrying out the invention, the elastomeric or thermoplastic polymer is dissolved in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, toluene, cyclohexane, pentane, isopentane, hexane, isohexane or heptane. The preferred solvents for elastomers are the lower boiling aliphatic hydrocarbons. A sulfonating agent is added to the solution of the elastomeric polymer and nonreactive solvent at a temperature of about $-10°$ C. to about 100° C. for a period of time of about 1 to about 60 minutes, more preferably at room temperature for about 5 to about 45 minutes; most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for the invention is an acyl sulfate selected from the group consisting essentially of benzoyl, acetyl, propionyl or butyryl sulfate. The acyl sulfate can be formed in situ in the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with: an aliphatic alcohol such as methanol, ethanol, isopropanol; an aromatic hydroxyl compound, such as phenol; a cycloaliphatic alcohol such as a cyclohexanol; or water. The acid form of the sulfonated elastomeric polymer has about 10 to about 60 meq. $SO_3H$ groups per 100 grams of sulfonated polymer, more preferably about 15 to about 50; and most preferably about 20 to about 40. The meq. of $SO_3H/100$ grams of polymer is determined by both titration of the polymeric sulfonic acid and Dietert Sulfur analysis. In the titration of the sulfonic acid, the polymer is dissolved in solvent consisting of 95 parts of toluene and 5 parts of methanol at a concentration level of 50 grams per liter of solvent. The acid form is titrated with ethanolic sodium hydroxide to an Alizarin-Thymolphthalein endpoint.

Neutralization of the acid form of the sulfonated elastomeric or thermoplastic polymer is done by the addition of a solution of neutralizing agent such as a metal acetate or ammonium bases or amines such as ammonium acetate to the acid form of the sulfonated elastomeric polymer dissolved in the mixture of the aliphatic alcohol and non-reactive solvent. The metal acetate is dissolved in a binary solvent system consisting of water and/or an aliphatic alcohol. Typically, but non-limiting metal acetates are sodium acetate, ammonium acetate, barium acetate, magnesium acetate, potassium acetate, lead acetate, and zinc acetate, wherein zinc acetate is preferred. Typical amines are the simpler lower molecular weight amines such as methylamine, ethylamine, butylamine, dimethylamine, trimethylamine, cyclohexylamine, piperidine and aniline.

Sufficient neutralizing agent is added to the solution of the acid form of the sulfonated elastomeric or thermoplastic polymer to effect neutralization of the $SO_3H$ groups. It is preferable to neutralize at least 95% of the acid groups, more preferably about 98%, most preferably 100%.

The neutralizing agents of the present invention are metallic salts of carboxylic acids and are not restricted to the previously mentioned metallic acetates, wherein the metallic ion of the metallic salt is selected from the group consisting of Groups IA, IIA, IB, IIB, iron, antimony, or lead of the Periodic Table of Elements and mixtures thereof. Suitable monovalent metal ions are Na, K, Li, Cs, Ag, and Cu. Suitable divalent metal ions are Ba, Mg, Ca, Sr, Ba, Cu, Cd, Hg, Fe, Pb, Co, Ni and Zn.

The carboxylate ion of the metallic salt is derived from the following carboxylic acids as illustrated in the present invention; however, other carboxylic acids of the same generic class can be readily employed and are considered within the spirit and scope of the present embodiment. These carboxylic acids are: acetic, benzoic, lauric, palmitic, myristic, decanoic, octanoic, and stearic.

Other neutralizing agents of this invention are metallic hydroxides, wherein the metallic ion is selected from the group consisting essentially of Groups IA and IIA and mixtures thereof of the Periodic Table of Elements. Illustrative examples are sodium hydroxide, barium hydroxide, calcium hydroxide or magnesium hydroxide.

The neutralizing agent is added to the acid form of the sulfonated polymer in solution, after the sulfonation reaction has been quenched with an aliphatic alcohol selected from the group consisting essentially of methanol, ethanol, n-propanol, isopropanol, isobutanol or n-butanol. Alternatively, the acid form of the sulfonated polymer can be isolated as a crumb from solution by steam stripping and neutralized with a neutralizing agent at low temperatures (less than 150° F.) on a two roll mill.

To the neutralized sulfonated polymer in the solution is added a reactive plasticizer. The neutralized sulfonated polymer can also be suspended in a liquid medium as a slurry. Alternatively, the reactive plasticizer can be added to the neutralized sulfonated polymer in powdered form by a simple dry blending operation as is commonly employed in the plastics industry. Surprisingly, it is found that this same approach can be employed with the sulfonated elastomers of this invention.

The reactive plasticizer which is polymerized at elevated temperatures by a free radical polymerization into a thermoset polymer is added at ambient temperatures to the sulfonated polymer wherein the reactive plasticizer is preferably an $\alpha,\beta$-unsaturated monocarboxylic ester. The $\alpha,\beta$-unsaturated monocarboxylic ester is formed by the reaction of a polyhydric alcohol with an $\alpha,\beta$-unsaturated monocarboxylic acid. The polyhydric alcohol is selected from the group consisting essentially of ethylene glycol, diethylene glycol, 1,3-butanediol, triethylene glycol, tetraethylene glycol, glycerin, trimethylolpropane, pentaerythritol, or sorbitol and mixtures thereof. The $\alpha,\beta$-unsaturated carboxylic acid is selected from the group consisting essentially of acrylic or methacrylic acids. The preferred reactive plasticizer esters are the acrylate esters of the glycols such as ethylene glycol dimethacrylate, propylene glycol dimethacrylate, and 1,1,1-trimethylolpropane trimethacrylate.

The concentration of reactive plasticizer in the compositions of the present invention is about 1 to about 50 parts per hundred by weight based on 100 parts of the neutralized sulfonated polymer, more preferably about 5 to about 30, and most preferably about 5 to about 25.

The free radical catalyst is added to the sulfonated polymer containing the reactive plasticizer either in solution, slurry, or in bulk on a two roll mill. The free radical catalyst is preferably an organic peroxide selected from the group consisting essentially of t-butyl hydroperoxide, dicumyl peroxide, lauroyl peroxide, benzoyl peroxide or other peroxides commonly employed in free radical polymerization reactions. Alternatively, other free radical sources are azo-bis-isobutyronitriles. The free radical catalyst is added at a concentration level of about 0.05 to about 5 parts per hundred by weight based on 100 parts of the reactive plasticizer component, more preferably about 0.1 to about 3, and most preferably about 0.5 to about 2.

The mixture of the neutralized sulfonated polymer, reactive plasticizer and catalyst from a solution formed at ambient temperatures is isolated by steam stripping, dried, and ground into a form capable of being fed into a conventional piece of plastic fabrication equipment such as an extruder. Alternatively, the blend of the neutralized sulfonated polymer, reactive plasticizer, and catalyst can be formed by a simple dry blending process. When the composition is processed through the extruder, the reactive plasticizer plasticizes the ionic groups of the neutralized sulfonated polymer at a lower elevated temperature of about 80° C. to about 160° C. which is below the fabrication temperature of the compositions thereby improving the rheological properties of the composition. When the temperature of the composition reaches the decomposition temperature of the free radical catalyst (also fabrication temperature of the composition), the free radical catalyst initiates polymerization of the reactive plasticizer to form a thermoset polymer of the reactive plasticizer. The molecular chains of the neutralized sulfonated polymer and the thermoset polymer are substantially entangled due to degree of mixing obtainable when the reactive plasticizer has solvated the polymeric backbone of the neutralized sulfonated polymer at ambient temperatures. In addition, there may be some grafting of the thermoset polymer chains to the sulfonated polymer system depending on the conditions and type of reactants.

The composition comprised of the neutralized sulfonated polymer, reactive plasticizer and catalyst can be blended with various chemical additives to modify the physical and rheological properties of the compositions. These chemical additives can be selected from the group consisting essentially of fillers, oils, pigments, polyolefins thermoplastics or waxes and mixtures thereof. Typical fillers employed in the instant invention are calcium carbonate, carbon black, clays or talcs. The oils are selected from the group consisting essentially of paraffinics, naphthenics, or aromatics and mixtures thereof. The waxes are selected from the group consisting essentially of naphthenics, paraffinics, or aromatics and mixtures thereof. The pigments are selected from the group consisting of organic or inorganics and mixtures thereof.

DETAILED DESCRIPTION

Figure 1:
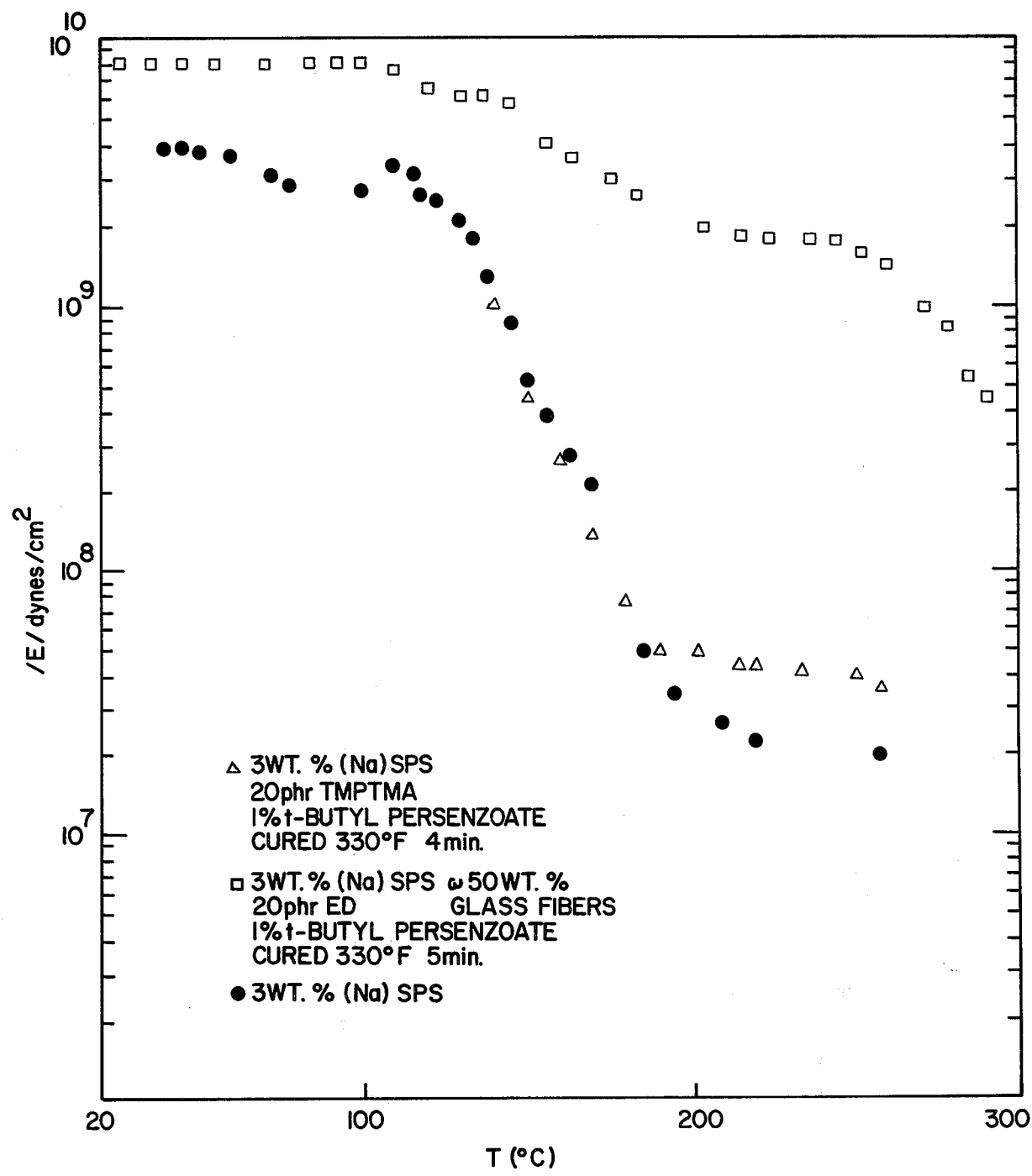
FIG. 1 illustrates a graph of the effect of temperature on the modulus for systems containing reactive plasticizer in sulfonated polystyrene systems.

The advantages of both the process and the resultant compositions having a different balance of physical properties can be more readily appreciated by reference to the following examples and tables.

EXAMPLE 1

A sample of sulfonated polystyrene was prepared following the procedures set out in U.S. Pat. No. 3,870,841. The resulting sodium sulfonated polystyrene had a sodium sulfonate content of about 2.8 mole percent based on sulfur analysis. This analysis signifies that on the average about 2.8 out of every 100 monomer repeat units were substituted on the polystyrene backbone.

EXAMPLE 2

A sample of sulfonated ethylene propylene terpolymer (EPDM) was sulfonated according to the procedures taught in U.S. Pat. No. 3,836,511 and neutralized with di-o-tolyl-guanidine to form the neutralized sulfonated EPDM. The starting EPDM had an ethylene content of about 65 wt. %, a propylene content of about 32% and about 3 wt. % of 5-ethylidene-2-norbornene and having a Mooney Viscosity (ML, 1 + 8, 260° F.) of about 50. The neutralized sulfonated EPDM had a sulfonate content of about 0.8 mole percent sulfonate (or about 0.8 weight % contained sulfur).

EXAMPLES 3–6

In 1000 parts by volume of normal pentane was suspended 100 parts of the sulfonated polystyrene described in Example 1 and 20 parts of ethylene dimethacrylate (ED) was added with stirring followed by 0.2 parts of t-butyl hydroperoxide-90. After ½ hour of stirring, the pentane was removed by evaporation at ambient conditions, and in some cases was vacuum dried at 50° C. Unsulfonated polystyrene was treated similarly. Two levels of ED were added in each use, and a description of the systems is provided in Table I.

TABLE I

| Example | Polymer | Monomer | Catalyst* | Appearance of Final Mixture |
|---|---|---|---|---|
| 3 | 100 parts PS | 20 phr ED | 1% | Cold flow at |

TABLE I-continued

| Example | Polymer | Monomer | Catalyst* | Appearance of Final Mixture |
|---|---|---|---|---|
| 4 | 100 parts PS | 10 phr ED | t-butyl hydroperoxide-90 1% t-butyl hydroperoxide-90 | ambient conditions Tacky particles |
| 5 | 100 parts SPS | 10 phr ED | 1% t-BHP-90 | Free flowing powder |
| 6 | 100 parts SPS | 20 phr ED | 1% t-BHP-90 | Tacky particles |

*Concentration based on monomer content

The data in Table I clearly indicates that a combination of 10 parts of reactive plasticizer with polystyrene results in a tacky powder whereas with 20 parts of plasticizer the entire mass starts to agglomerate. On the other hand, a combination of 10 parts of plasticizer with the sulfonated polymer provides a free flowing powder, and increasing the level of plasticizer provides a powder which is more tacky, yet does not agglomerate as with PS. It is evident that the sulfonate groups provide a degree of integrity to the SPS which is not eliminated at ambient temperature by the presence of these levels of reactive plasticizer.

Selected samples of the systems described in Table I were compression molded at a temperature of 230 to 250° F., and others were compression molded and cured at 360° F. for about 3–5 minutes. The tensile data obtained on these samples are shown in Table II.

TABLE II

Effect of Reactive Plasticizer On Polymer Properties

| Example | Tensile Strength (psi) | Modulus (psi × 10⁻⁶) | Comment |
|---|---|---|---|
| 3 | 1800 | 0.18 | uncured |
| 4 | 3250 | 0.307 | cured at 360° F. |
| 5 | 2500 | 0.251 | cured at 360° F. |
| 6* | 6340 | 0.31 | cured at 360° F. |

*Only one sample showed these properties; other data are average of several values.

It should be cautioned that results obtained with the samples described in Table II can be quite variable and preferably should be established from larger samples as well as a sufficiently large number to eliminate random variations. It is evident that the compression molded sample based on polystyrene which is not cured possesses a low tensile strength and a low modulus. The samples based on SPS which are cured display significantly higher tensile properties.

Figure 2:
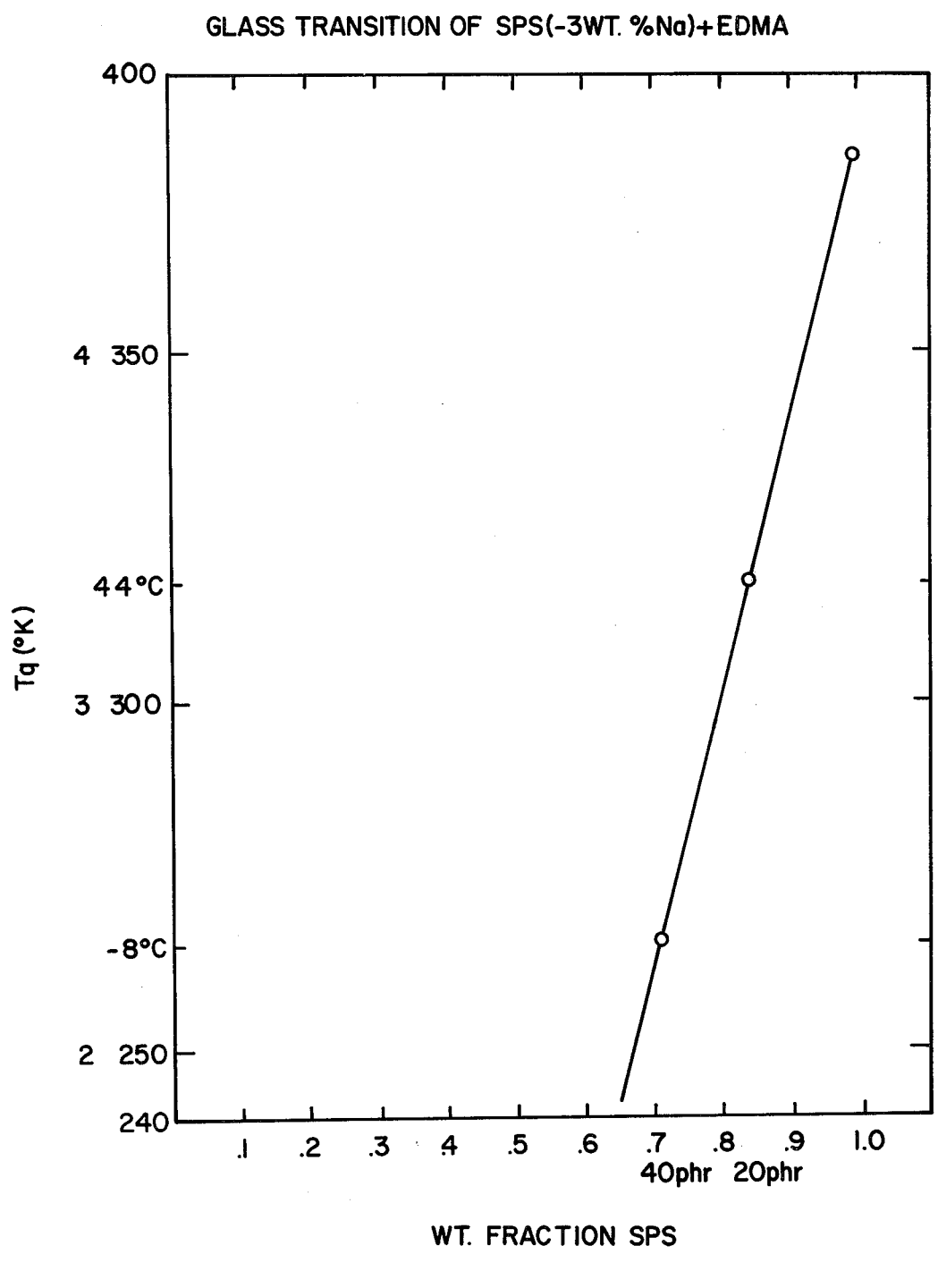
FIG. 2 illustrates a graph of the quantitative relationship of the glass transition temperature as a function of weight fraction of a sulfonated polystyrene in a mixture of sulfonated polystyrene and a reactive plasticizer.

In addition to achieving selected physical properties, it is observed that the presence of the reactive plasticizer also enhances the flow of such sulfonated polymers at suitably elevated temperatures before the curing process is complete. This is illustrated by the drop in glass transition temperature as a function of plasticizer content as illustrated in FIG. 2. It is now well known that polymers containing low levels of metal sulfonate groups are very difficult to melt process as thermoplastics due to their strong ionic interactions. Numerous approaches have been evaluated to circumvent this problem; however, all have some disadvantages, especially those which are most effective in promoting flow. The instant invention presents an approach which permits improved ease of fabrication, yet after curing the plasticizer there is no net plasticizing effect which perturbs the metal sulfonate groups. Therefore, this approach has the potential of retaining all the desirable aspects of sulfonated polymers, yet minimizes some of their major disadvantages.

EXAMPLE 7

A sample of sulfonated EPDM prepared according to the description of Example 2 was employed as the sulfonated polymer. This sample was neutralized with di-o-tolyl guanidine and contained about 0.8 mole percent sulfonate groups (or about 25 milliequivalents sulfonate per 100 gms. polymer). Twelve parts by weight of the polymer were blended with 1 part of 1,1,1-trimethylolpropane trimethacrylate and .01 part of tertiary butyl perbenzoate. The resulting blend was compression molded at 380° F. The presence of the plasticizer was observed to improve the flow of the sulfonated polymer. Tensile properties were obtained on the cured sulfonated product at a cross head speed of 2 inches/minute. An average tensile strength of about 2270 psi was obtained for this sample with an ultimate elongation of about 490% and a modulus at 100% elongate of about 320 psi.

EXAMPLES 8 and 9

These examples will describe how a combination of sulfonated polymer and a reactive plasticizer can be employed with and without glass fibers to create a polymer system with unusual and desirable resistance to high temperature. 100 parts of the SPS polymer described in Example 1 was combined with 20 parts by weight ethylene dimethacrylate with 1 part t-butyl perbenzoate by dissolution of the components in a solvent system composed of toluene and isopropanol (9:1 by volume) at a polymer concentration of about 10. The solvent was evaporated and the resultant product (Sample A) was then compression molded at 330° F. for 4 minutes to polymerize and cure the reactive plasticizer. The resultant compression molded pad was then employed as a test specimen in a Rheovibron apparatus. The information from this test provides the modulus of the sample over a range of temperature as shown in Table III as shown in FIG. 1. These data show that very little change in modulus for the polymer sample is observed until a temperature of about 140 to 150° C. is reached, and above 180° C. a material which is analogous to a rubbery or leathery product is obtained.

TABLE III

MODULUS TEMPERATURE BEHAVIOR OF SPS - PLASTICIZER COMPOSITION

| T (° C.) | Modulus dynes/cm² |
|---|---|
| 40 | 2.2 × 10⁹ |
| 140 | 1.0 × 10⁹ |
| 150 | 4.6 × 10⁸ |
| 160 | 2.6 × 10⁸ |
| 170 | 1.3 × 10⁸ |
| 180 | 7.8 × 10⁷ |
| 190 | 5.0 × 10⁷ |
| 203 | 5.0 × 10⁷ |
| 215 | 4.3 × 10⁷ |
| 220 | 4.3 × 10⁷ |
| 234 | 4.1 × 10⁷ |
| 250 | 4.0 × 10⁷ |

A sample of the solution described above for the preparation of Sample A was employed to coat a glass mat if randomly oriented discontinuous fibers. The solvent was then evaporated leaving the glass fibers coated with polymer, reactive plasticizer, and catalysts (50% by weight glass fibers). The resultant mat was cut into sections and compression molded at 100° C. for 3 minutes. Even at this low temperature the presence of the plasticizer permitted sufficient flow to fill the cavity and provide a more or less flexible fiber reinforced article. This pad was then compression molded at 330° F. for 5 minutes to cure the system and thereby yield a rigid article. The pad was then sectioned and the modulus temperature measurements obtained on a Rheovibron as shown in Table IV.

These data show that the resultant glass fiber reinforced SPS suitably modified with cured plasticizer exhibits an extremely high modulus even up to 260° C. More significantly, the marked change in modulus observed with most polymers near their glass transitions or crystalline melting points appears to be absent here. In any event there is little change in stiffness from room temperature up to 260° C. These effects are further illustrated in FIG. 1.

TABLE IV
MODULUS TEMPERATURE BEHAVIOR OF GLASS REINFORCED SPS - PLASTICIZER SYSTEM

| T (° C.) | Modulus dynes/cm$^2$ |
|---|---|
| 26 | $8.00 \times 10^9$ |
| 45 | $8.01 \times 10^9$ |
| 70 | $8.03 \times 10^9$ |
| 85 | $8.05 \times 10^9$ |
| 100 | $7.78 \times 10^9$ |
| 120 | $6.28 \times 10^9$ |
| 130 | $5.96 \times 10^9$ |
| 145 | $5.59 \times 10^9$ |
| 164 | $3.65 \times 10^9$ |
| 185 | $2.63 \times 10^9$ |
| 202 | $2.06 \times 10^9$ |
| 225 | $1.92 \times 10^9$ |
| 243 | $1.79 \times 10^9$ |
| 260 | $1.39 \times 10^9$ |

What is claimed is:

1. An improved process for the preparation of a plasticized composition of a sulfonated polymer from a neutralized sulfonated polymer having about 0.1 to about 10.0 mole percent sulfonate groups, at least 90% of which being neutralized with a neutralizing agent selected from the group consisting of metallic derivatives of organic acids, metallic alkanoates, metallic hydroxides, and amine derivatives and mixtures thereof, wherein the improvement comprises:
   (a) adding at ambient temperature about 1 to about 50 parts per hundred by weight of a reactive plasticizer to 100 parts of said neutralized sulfonated polymer to form a mixture of said sulfonated polymer and said reactive plasticizer, said plasticizer being an ester of an $\alpha,\beta$-unsaturated monocarboxylic acid;
   (b) adding a free radical catalyst to said mixture at a concentration level of at least about 0.05 parts per hundred by weight of said reactive plasticizer;
   (c) heating said mixture with said free radical catalyst to a first temperature for solvating said neutralized sulfonate groups with said reactive plasticizer; and
   (d) further heating said mixture with said reactive plasticizer to a second temperature sufficient to permit processability of said composition and to cause said free radical catalyst to polymerize said reactive plasticizer within said mixture, said second temperature being greater than said first temperature and above a decomposition temperature of said free radical catalyst.

2. An improved process according to claim 1, wherein said sulfonated polymer is selected from the group consisting of, polyvinyl aromatics, EPDM terpolymers, Butyl rubbers, partially hydrogenated polyisoprene, isoprene-styrene copolymers, partially hydrogenated polybutadiene, and styrene-butadiene rubbers.

3. An improved process according to claim 1, wherein said sulfonated polymer is sulfonated polystyrene.

4. An improved process according to claim 1, wherein said sulfonated polymer has a hydrocarbon elastomeric backbone.

5. An improved process according to claim 1, wherein said sulfonated polymer is an EPDM terpolymer, said EPDM terpolymer having about 50 to about 75 wt. % ethylene, about 10 to about 53 wt. % propylene, and about 2 to about 10 wt. % of a non-conjugated diene.

6. An improved process according to claim 5, wherein said non-conjugated diene is selected from the group consisting of 1,4-hexadiene, dicyclopentadiene, 5-ethylidene-2-norbornene/5-methylene-2-norbornene, and tetrahydroindene.

7. An improved process according to claim 1, wherein said first temperature is about 50° C. to about 150° C.

8. An improved process according to claim 1, wherein said second temperature is at least about 100° C.

9. An improved process according to claim 1, wherein a metal ion of said metallic derivative of said organic acid is selected from the group consisting of iron, antimony, lead and Groups IA, IIA, IB and IIB of the Periodic Table of Elements and mixtures thereof.

10. An improved process according to claim 1, wherein a metal ion of said hydroxides or said alkanoates is selected from the group consisting of Groups IA and IIA.

11. An improved process according to claim 1, wherein said amine has at least one organic radical selected from the group consisting of about $C_1$ to $C_{30}$ alkyl, phenyl, aralkyl, and alkaryl and mixtures thereof.

12. An improved process according to claim 1, wherein said ester of said $\alpha,\beta$-unsaturated carboxylic acid is formed from a polyhydric alcohol.

13. An improved process according to claim 12, wherein said polyhydric alcohol is selected from the group consisting of ethylene glycol, diethylene glycol, 1,3-butanediol, triethylene glycol, tetraethylene glycol, glycerin, trimethylol propane, pentaerythritol, and sorbitol and mixtures thereof.

14. An improved process according to claim 12, wherein said $\alpha,\beta$-unsaturated carboxylic acid is selected from the group consisting of acrylic acid and methacrylic acid.

15. An improved process according to claim 1, wherein said free radical catalyst is an organic peroxide.

16. The product prepared by the process of claim 1.

17. An improved process according to claim 1, further including step of impregnating a substrate with said composition.

18. A solid polymeric composition comprising:
   (a) a neutralized sulfonated polymer;
   (b) about 1 to about 50 parts by weight of a reactive plasticizer per 100 parts of said neutralized sulfonated polymer, said reactive plasticizer being polymerizable into a thermoset polymer, said plasticizer being an ester of an $\alpha,\beta$-unsaturated monocarboxylic acid; and (c) at least about 0.05 parts by weight of a free radical catalyst per 100 parts of said reactive plasticizer for polymerizing said reactive plasticizer into said thermoset polymer thereby forming a heterogeneous mixture of said neutralized sulfonated polymer and said thermoset polymer.

19. A composition according to claim 18, wherein said sulfonated polymer is selected from the group consisting of, polyvinyl aromatics, EPDM terpolymers, Butyl rubbers, partially hydrogenated polyisoprene, isoprene-styrene copolymers, partially hydrogenated polybutadiene and styrene-butadiene rubbers.

20. A composition according to claim 18, wherein said sulfonated polymer is sulfonated polystyrene.

21. A composition according to claim 18, wherein said sulfonated polymer has a hydrocarbon elastomeric backbone.

22. A composition according to claim 18, wherein said sulfonated polymer is an EPDM terpolymer, said EPDM terpolymer having about 50 to about 75 wt. % ethylene, about 10 to about 53 wt. % propylene, and about 2 to about 10 wt. % of a non-conjugated diene.

23. A composition according to claim 22, wherein said non-conjugated diene is selected from the group consisting of 1,4-hexadiene, dicyclopentadiene, 5-ethylidene-2-norbornene, 5-methylene-2-norbornene and tetrahydroindene.

24. A composition according to claim 18, wherein said neutralized sulfonated polymer has about 0.1 to about 10 mole percent sulfonate groups, at least 90% of which being neutralized with a neutralizing agent selected from the group consisting of metallic derivatives or organic acids, metallic alkanoates, metallic hydroxides and amine derivatives and mixtures thereof.

25. A composition according to claim 24, wherein a metal ion of said metallic derivative of said carboxylic is selected from the group consisting of iron, antimony, lead and Groups IA, IIA, IB and IIB of the Periodic Table of Elements and mixtures thereof.

26. A composition according to claim 24, wherein a metal ion of said hydroxides or said alkanoates is selected from the group consisting of Groups IA and IIA.

27. A composition according to claim 24, wherein said amine has at least one organic radical selected from the group consisting of about $C_1$ to $C_{30}$ alkyl, phenyl, aralkyl, and alkaryl and mixtures thereof.

28. A composition according to claim 18 wherein said ester of said $\alpha,\beta$-unsaturated carboxylic acid is formed from a polyhydric alcohol.

29. A composition according to claim 28, wherein said polyhydric alcohol is selected from the group consisting of ethylene glycol, diethylene glycol, 1,3-butanediol, triethylene glycol, tetraethylene glycol, glycerin, trimethylol propane, pentaerythritol and sorbitol and mixtures thereof.

30. A composition according to claim 28, wherein said $\alpha,\beta$-unsaturated carboxylic acid is selected from the group consisting of acrylic acid and methacrylic acid.

31. A composition according to claim 18, wherein said free radical catalyst is an organic peroxide.

32. A composition according to claim 18, further including said composition impregnated into a substrate.

33. An improved process according to claim 1 wherein said sulfonated polymer is a sulfonated polystyrene.

34. A composition according to claim 18 wherein said sulfonated polymer is a sulfonated polystyrene.

* * * * *